3,563,900
PAINT STRIPPING COMPOSITION AND METHOD
Donald P. Murphy, Roseville, Mich., assignor to Hooker Chemical Corporation, Niagara Falls, N.Y., a corporation of New York
No Drawing. Filed Oct. 27, 1967, Ser. No. 678,524
Int. Cl. C11d 7/12, 7/14, 7/16
U.S. Cl. 252—135
12 Claims

ABSTRACT OF THE DISCLOSURE

A composition useful in removing paint and similar protective coating from a substrate which comprises an aqueous dispersion of beta-naphthol, said dispersion containing both dissolved and undissolved beta-naphthol. The aqueous dispersion may be either, acid, neutral or mildly alkaline and in the latter instance may contain mildly alkaline materials such as sodium tetraborate, sodium metasilicate, disodium phosphate, and the like. The composition is particularly useful in removing alkyd and acrylic type paints from aluminum, as it effects rapid removal of these coatings without attack on the aluminum.

This invention relates to a composition and method for removing protective coatings from surfaces and more particularly it relates to an improved composition and process for removing paint and similar protective coatings from metallic surfaces, and in particular from aluminum.

In the manufacture of various commercial articles, it is often the practice to provide such articles with a protective and/or decorative coating. The coatings applied include paints, varnishes, lacquers, and the like, and are formulated from numerous and diverse ingredients, including acrylic resins, alkyd resins, epoxy resins, vinyl resins, and the like. Improvements in the adhesion and durability of these coatings have continually been made, so that the removal of these coatings, after they have been applied, cured and/or dried, has become increasingly difficult. These difficulties have been particularly encountered when using chemical means to effect the removal of such coatings. Thus, it has become necessary to subject the coated surfaces to the action of increasingly stronger chemical compositions for longer periods of time in order to effect the desired removal of the paint or similar coating.

In many instances, the coating removal compositions used have had to be of a sufficient strength and are used for a sufficiently long period of time that there has been an appreciable attack on the metal substrate to which the coatings have been applied. This has been found to be particularly true in the case of coated aluminum articles. Moreover, even where the metal substrate has not been attacked, the long contact times which have been required to effect loosening of the coatings have frequently not been economically feasible.

It is, therefore, an object of the present invention to provide an improved composition for the removal of protective and/or decorative coatings from surfaces to which they have been applied.

Another object of the present invention is to provide an improved coating removal composition, which composition is effective in removing protective and/or decorative coatings in a relatively short time without adverse effect on the substrate to which the coating is applied, particularly aluminum metal substrates.

A further object of the present invention is to provide an improved method for removing coatings from surfaces to which they have been applied, which method may be carried out in a relatively short period of time without adverse affect on the surface itself.

These and other objects will become apparent to those skilled in the art from the description of the invention which follows.

Pursuant to the above objects, the present invention includes a composition useful in removing paint and similar protective coatings from a substrate, which composition comprises an aqueous mixture of beta-naphthol, which mixture contains both dissolved and undissolved beta-naphthol. When this composition is applied to a substrate containing a paint or similar protective and/or decorative coating, it is found that the coating is quickly loosened on the surface so that it may be easily removed, frequently as a single film.

More specifically, in the practice of the present invention, the paint stripping composition used is an aqueous admixture of beta-naphthol, which mixture contains both dissolved and undissolved beta-naphthol. The aqueous admixture is either acid, neutral or mildly alkaline, the aqueous system having a pH within the range of about 1 to 12. Thus, the paint stripping composition may be an admixture of beta-naphthol in water alone or it may also contain one or more acids, acid salts, or alkaline salts, the type and amount of which are adjusted so as to maintain the pH of the resulting mixture in the range indicated. In either instance, however, it is important, in order to obtain satisfactory removal of the paint or other coatings from the substrate, that the aqueous mixture contain both dissolved and undissolved beta-naphthol.

Where the treating compositions used is an admixture of beta-naphthol and water, the beta-naphthol, is, of course, present in an amount sufficient to provide for both dissolved and undissolved beta-naphthol in the water. Typically, amounts of beta-naphthol in the range of about 0.1 to 2 pounds per gallon may be used, with amounts within the range of about 0.2 to 1 pound per gallon being preferred.

As has been previously noted, the treating compositions of the present invention may also contain one or more acid or alkaline salts, the more mild acid or alkaline salts being preferred. In such instances, the beta-naphthol is desirably incorporated in a solid or substantially dry alkaline composition containing various alkaline or acid salts, which compositions may be dissolved or dispersed in water to form the desired treating mixtures. These solid or substantially dry alkaline or acid compositions also constitute a part of the present invention. This solid, substantially dry concentrate composition may contain one or more various alkaline or acid salts desirably in amounts within the range of about 5% to about 95% by weight of the composition, with amounts within the range of about 10% to 60% by weight of the composition being preferred. Desirably, the alkaline salts used are the mild, inorganic alkaline salts, such as the alkali metal tetraborates, alkali metal silicates, mono and di- alkali metal phosphates, alkali metal carbonates, alkali metal bicarbonates, and the like. Of these, the preferred alkali metal salts are the sodium salts, such as sodium tetraborate, sodium metasilicate, disodium phosphate, sodium carbonate, sodium bicarbonate, and the like, although the alkaline salts of other alkali metals, such as potassium, lithium, cessium, or rhubidium, may also be used. Additionally, the alkaline composition may also contain the more highly alkaline salts such as the alkali metal hydroxides, trialkali metal phosphates, and the like. Where such more highly alkaline salts are utilized, it will, of course, be appreciated that choice of the type and amount of such highly alkaline salts will be made, in each instance, so that when the resulting alkaline composition is dissolved or dispersed in water, the resulting aqueous admixture will have a pH within the range of about 7 to 12, so that both dissolved and undissolved beta-naphthol are present.

The acid salts which may be included in the composition are, desirably, the more mild inorganic acid salts, such as monosodium dihydrogen phosphate, sodium acid sulfate, and the like. Organic acid salts, such as the sodium salts of tartaric acid, oxalic acid, citric acid, and the like may also be used, however. Additionally, the composition may also include acids themselves, such as the aforesaid organic acids, as well as various inorganic mineral acids, such as sulfuric acid, hydrochloric acid, phosphoric acid, and the like.

In addition to the alkaline or acid materials as indicated hereinabove, the alkaline or acid compositions will also contain beta-naphthol, the amount of this component in the composition being sufficient to provide both dissolved and undissolved beta-naphthol in the aqueous treating mixture when the composition is dispersed in water in the desired amount. Typically, the composition will contain the beta-naphthol in amounts within the range of about 5 to 95% by weight, with amounts within the range of about 10 to 30% by weight being preferred.

Surface active or wetting agents may also be included in the composition, typically in amounts up to about 10% by weight of the composition, with amounts within the range of about 0.1 to 7 percent by weight being preferred. Various suitable surface active agents of the anionic, non-ionic and cationic types may be used, provided they are soluble and effective in the aqueous treating mixtures which are formed. In many instances, excellent results have been obtained when using wetting or surface active-agents of the phosphate ester type and/or the sulfated alcohol type. Exemplary of surface active agents of these types are Triton OS-44 and Tergitol O8, respectively.

The aqueous treating mixtures of the present invention containing both dissolved and undissolved beta-naphthol and having a pH within the range of about 1 to 12 may be formulated by admixing beta-naphthol per se, in water, in amounts sufficient to give the desired treating mixture, as has been indicated hereinabove. Alternatively, the aqueous treating mixtures may be formed by admixing the substantially solid, dry alkaline or acid composition which contains beta-naphthol, as described above, with water, in amounts sufficient to form the desired treating mixture containing both dissolved and undissolved beta-naphthol and having a pH within the desired range. Typically, such aqueous treating mixtures may be formed by mixing the composition with water in amounts within the range of about 0.2 to 2 pounds per gallon, with amounts within the range of about 0.5 to 1.5 pounds per gallon being preferred. Exemplary of preferred alkaline compositions which may be used to formulate the aqueous treating mixtures of the present invention, are compositions containing the following components in amounts within the ranges indicated:

| Components: | Percent by weight |
|---|---|
| Sodium tetraborate (10 hydrate) | 0–40 |
| Sodium metasilicate (5 hydrate) | 0–40 |
| Disodium phosphate | 0–40 |
| Phosphate ester wetting agent | 0.1–10 |
| Sulfated alcohol wetting agent | 1–10 |
| Beta-naphthol | 5–100 |

When compositions of this type are admixed with water in amounts within the range of about 0.5 to 2.0 pounds per gallon, an aqueous paint removing mixture is formed having a pH from about 7 to 12 and containing both dissolved and undissolved beta-naphthol.

In effecting the removal of paints and similar coatings in accordance with the present invention, the aqueous stripping mixture, formulated as has been indicated hereinabove, is brought into contact with the substrate from which it is desired to effect removal of paint or similar protective or decorative coatings. The contact times required to effect a substantial loosening of the paint from the substrate will, of course, depend upon the nature and thickness of the paint which is to be removed. With some paint, contact times of a few minutes, e.g. 2 to 3 minutes may be sufficient while with other and more difficulty removable paints, appreciably longer contact times, e.g., 30 minutes or more, may be desirable. Accordingly, it is not possible to give specific contact times which will be used in each instance, inasmuch as the times of contact used will be those which will effect a substantial loosening of the paint on the surface.

In this regard, it is to be noted that it is not essential that the aqueous stripping mixture of the present invention remain in contact with the coated substrate for a period of time sufficient to effect a complete removal of the coating from the surface. It is only necessary that the contact time be sufficient to effect a loosening of the paint film on the surface so that it may then be removed by brushing, hard pressure water sprays, or the like. It is to be noted, however, that in many instances, when using the aqueous stripping mixtures of the present invention, there results a breaking of the bond between the paint film and the surface so that the coating may often be lifted off as a single film.

Generally, it is desirable that the contact between the present stripping mixtures and the substrate from which the coating is to be removed is effected by immersing the substrate in the stripping mixture. In this manner, a rapid and continuous wetting of the surface film by the stripping mixture is obtained with little or no loss of the stripping composition. In some instances, however, particularly when less difficultly removable films are to be treated, other contacting techniques, such as spraying, flooding, or the like may be utilized.

Desirably, the aqueous stripping mixture is at an elevated temperature when it is brought into contact with the substrates from which the protective film is to be removed. Preferably, the aqueous mixture is at a temperature which is close to its boiling point, with temperatures within the range of about 90 to 100 degrees centigrade being typical. It will be appreciated, however, that in some instances higher or lower temperatures, e.g., room temperature may also be used.

After the substantial loosening of the protective film on the surface being treated has been effected, and the film has been removed from the surface, either by retaining the substrate in the stripping mixture until removal is complete or by utilizing other removal techniques on the loosely adhering film, such as brushing, high pressure sprays or the like, the surface is then in condition to be recoated with a new protective film. Generally, it is preferred that the surface be rinsed so as to remove any of the stripping mixture which may be retained on the surface, prior to again subjecting the surface to a coating operation.

It has been found that the aqueous stripping mixtures as described above are effective for removing a variety of paint and similar protective films, including enamels, varnishes, lacquers, and the like, and is particularly effective in removing such films which are of the acrylic and alkyd type. Moreover, while these films are effectively removed from a variety of substrates, including various metal surfaces, the subject compositions have been found to be particularly effective in removing such film from aluminum surfaces. Not only are these protective films quickly and sufficiently removed from aluminum surfaces by the present compositions, but additionally, it is found that the subject aqueous stripping admixture does not attack the aluminum surface itself.

In order that those skilled in the art may better understand the present invention and the manner in which it may be practiced, the following examples are given. It is to be appreciated, however, that these examples are merely exemplary of the compositions and processes of the present invention which may be used and are not to be taken as limiting this invention. In these examples unless otherwise indicated, temperatures are expressed in degrees centigrade and parts are and percent are by weight.

EXAMPLE 1

An alkaline concentrate composition was prepared containing the following components in the amounts indicated:

| Components: | Percent by weight |
|---|---|
| Sodium tetraborate .10H$_2$O | 40 |
| Sodium metasilicate .5H$_2$O | 18 |
| Disodium phosphate | 10 |
| Phosphate ester wetting agent | 1 |
| Sulfated alcohol wetting agent | 1 |
| Beta-naphthol | 30 |

An aqueous stripping mixture was formulated from this composition by mixing the composition with water in an amount of one pound per gallon. The resulting aqueous mixture had a pH of 10.2 and contained insoluble flakes of beta-napahthol. A steel test panel having a conventional iron phosphate paint-base coating over which had been applied a white alkyd enamel to a thickness of 1.5 mils was immersed in the thus-formulated aqueous treating mixture at a temperature of 93 degrees centigrade. After three minutes of immersion in the treating mixture, the enamel coating was completely loosened and was lifted from the metal as a single film.

EXAMPLE 2

The procedure of Example 1 was repeated, using the same aqueous treating mixture, with the exception that the steel test panel contained a 2.5 mil thick coating of a white acrylic paint. After 6 minutes of immersion in the aqueous treating mixture, the paint coating was completely loosened on the surface and was removed as a single film.

EXAMPLE 3

The procedure of Example 2 was repeated with the exception that the aqueous treating mixture used was formulated by mixing beta-naphthol in water in an amount of 1 pound per gallon. This aqueous treating mixture had a pH of 7.5 and contained insoluble flakes of beta-naphthol. Upon immersing the acrylic painted test panel in this treating mixture for 4.5 minutes, it was found that the paint was completely loosened from the metal surface and was removed as a single film.

EXAMPLE 4

By way of comparison, the procedure of Example 2 was repeated with the exception that sufficient dipropylene glycol was added to the aqueous beta-naphthol mixture to completely solubilize the beta-naphthol. When the acrylic coated test panels were immersed in this treating solution, it was found that the solution was substantially ineffective in removing this coating, no appreciable loosening of the film being evident even after the panel had been immersed in the solution for a period of 10 minutes.

EXAMPLE 5

The procedure of Example 1 was repeated with the exception that sufficient sodium hydroxide was added to the beta-naphthol mixture to completely solubilize the beta-naphthol. The mixture was maintained at the boiling point and the coated steel test panel immersed therein for 10 minutes with no effect on the paint film.

EXAMPLE 6

A concentrate composition was formulated having the following components in the amounts indicated:

| Components: | Percent by weight |
|---|---|
| Sodium metasilicate (anhydrous) | 70 |
| Sodium gluconate | 5 |
| Beta-naphthol | 25 |

An aqueous stripping mixture was formulated from this composition by mixing it with water in an amount of two pounds per gallon. The resulting solution had a pH of 12.1 and contained no insoluble flakes of beta-naphthol. A steel panel having been coated with a white acrylic paint, as in Example 2, was immersed in the solution, which was maintained at its boiling point. After 20 minutes immersion, there was still no effect on the paint film.

EXAMPLE 7

A concentrate composition was formulated using the following components in the amounts indicated:

| Components: | Percent by weight |
|---|---|
| Sodium dihydrogen phosphate | 67 |
| Beta-naphthol | 33 |

A stripping composition was made by mixing the concentrate with water in an amount of 1.5 pounds per gallon. This composition had a pH of 3.5, and contained insoluble flakes of the beta-naphthol. Upon immersing a steel test panel coated with a white acrylic paint, as in Example 2, in this composition, maintained at boiling, 90% of the paint was removed in 35 minutes.

EXAMPLE 8

The procedure of Example 7 was repeated with the exception that the concentrate contained sodium acid sulfate (NaHSO$_4$) in place of the sodium dihydrogen phosphate. The aqueous stripping composition, containing 1.5 pounds per gallon of this concentrate, had a pH of about 1 and contained insoluble flakes of beta-naphthol. With the composition maintained at boiling, 90% of the white acrylic paint was removed from the steel test panels after 35 minutes of immersion in the composition.

Additional concentrate compositions were formulated as follows:

| | Percent | | | | |
|---|---|---|---|---|---|
| | A | B | C | D | E |
| Sodium tetraborate .10H$_2$O | | | | 13 | |
| Sodium metasilicate .5H$_2$O | 29 | 35 | | | 13 |
| Disodium phosphate | 30 | 30 | 13 | | |
| Phosphate ester wetting agent | | 1 | 2 | 2 | 2 |
| Beta-naphthol | 30 | 25 | 65 | 65 | 65 |
| Tripropylene glycol | 3 | | | | |
| Lignin sulfonate rinsing aid | 3 | 3 | 20 | 20 | 20 |
| Sodium silicate having SiO$_2$:Na$_2$O of 3.22:1 | 5 | 6 | | | |

Stripping compositions were formulated from these by adding the concentrate to water. In each instance the resulting mixture contained insoluble flakes of beta-naphthol. Aluminum test panels, having a 2.5 mil thick coating of a white acrylic paint applied over a conventional chromate conversion coating were immersed in the boiling aqueous stripping mixtures to effect substantial loosening of the paint film. Using this procedure, the formulations used and the results obtained were as follows:

| Example | Concentrate composition | Concentration (pounds/gallon) | pH | Time in minutes to effect paint removal |
|---|---|---|---|---|
| 9 | A | 2 | 11.15 | 17 |
| 10 | B | 2 | 11.50 | (¹) |
| 11 | C | 1 | 7.2 | 6 |
| 12 | D | 1 | 8.6 | 35 |
| 13 | E | 1 | 10.55 | 35 |

¹ 60% removal in 90 minutes.

In each of the above, the removal of the paint from steel or aluminum surfaces was accomplished with no attack on the metal substrate itself.

While there have been described various embodiments of the invention, the compositions and methods described are not intended to be understood as limiting the scope of the invention as changes therein are possible and it is intended that each element recited in any of the following claims is to be understood as referring to all equivalent elements for accomplishing substantially the same results

What is claimed is:

1. A concentrate composition, useful when dispersed in water for removing paint and similar films, which consist essentially of at least one alkaline salt or acid salt, and beta-naphthol, the components being present in an amount sufficient to form an aqueous treating mixture containing dissolved and undissolved beta-naphthol having a pH within the range of about 1 to 12 when the composition is dispersed in water, the alkaline salt or acid salt being present in an amount within the range of about 5 to 95% by weight of the composition and the beta-naphthol being present in an amount within the range of about 5 to 95% by weight of the composition.

2. The composition as claimed in claim 1 wherein the composition contains an alkaline salt selected from the group consisting of alkali metal borates, alkali metal silicates, and alkali metal phosphates.

3. The composition as claimed in claim 1 wherein the composition contains an acid salt selected from the group consisting of alkali metal dihydrogen phosphates and alkali metal acid sulfates.

4. An aqueous paint removing composition which consists essentially of water and the concentrate composition as claimed in claim 1, which concentrate composition is admixed with the water in an amount within the range of about 0.1 to 2 pounds per gallon.

5. A method of removing paint and similar protective films from a substrate which comprises contacting the substrate from which the film is to be removed with the aqueous paint stripping composition as claimed in claim 4 and maintaining the substrate in contact with the stripping composition for a period to effect a substantial loosening of the film on the substrate.

6. The aqueous paint stripping composition as claimed in claim 4 wherein the concentrate composition used contains the alkaline or acidic components in amounts within the range of about 5 to 95 percent by weight and the beta-naphthol in an amount within the range of about 5 to 95 percent by weight.

7. A method of removing paint and similar protective films from a substrate which comprises contacting the substrate from which the film is to be removed with the aqueous paint stripping composition as claimed in claim 6 and maintaining the substrate in contact with the stripping composition for a period sufficient to effect a substantial loosening of the film on the substrate.

8. The aqueous paint stripping composition as claimed in claim 6 wherein the concentrate composition used contains an alkaline salt selected from the group consisting of alkali metal borates, alkali metal silicates and alkali metal phosphates.

9. A method of removing paint and similar protective films from a substrate which comprises contacting the substrate from which the film is to be removed with the aqueous paint stripping composition as claimed in claim 8 and maintaining the substrate in contact with the stripping composition for a period sufficient to effect a substantial loosening of the film on the substrate.

10. The aqueous paint stripping composition as claimed in claim 6 wherein the concentrate composition used contains an acid salt selected from the group consisting of alkali metal dihydrogen phosphates and alkali metal acid sulfates.

11. A method of removing paint and similar protective films from a substrate which comprises contacting the substrate from which the film is to be removed with the aqueous paint stripping composition as claimed in claim 10 and maintaining the substrate in contact with the stripping composition for a period sufficient to effect a substantial loosening of the film on the substrate.

12. A method of removing paint and similar protective films from a substrate which comprises contacting the substrate from which the film is to be removed with an aqueous paint stripping composition which consists essentially of an aqueous mixture of water and beta-naphthol, the beta-naphthol being present in an amount within the range of about 0.01 to 2 pounds per gallon of the aqueous mixture, and further being present in an amount sufficient to provide both dissolved and undissolved beta-naphthol in the mixture, and maintaining the substrate in contact with the aqueous paint stripping composition for a period sufficient to effect a substantial loosening of the film on the substrate.

References Cited

UNITED STATES PATENTS

| | | | |
|---|---|---|---|
| 2,381,124 | 8/1945 | Hart | 252—138 |
| 2,741,599 | 4/1956 | McDonald et al. | 252—138 |
| 2,853,364 | 9/1958 | Streicher | 23—121 |
| 3,335,087 | 8/1967 | Keers et al. | 252—143 |

OTHER REFERENCES

Chemical Abstracts, "Investigation of Monohydroxy Phenol-Water Systems," vol. 50, p. 8176a, 1956.

LEON D. ROSDOL, Primary Examiner

A. RADY, Assistant Examiner

U.S. Cl. X.R.

134—38; 252—136, 142, 156